Aug. 5, 1924.

DE WITT W. STRICKLAND 1,503,722

HARROW

Filed Aug. 17, 1922

Fig. 1.

Inventor

D. W. Strickland

By Lacey & Lacey, Attorneys

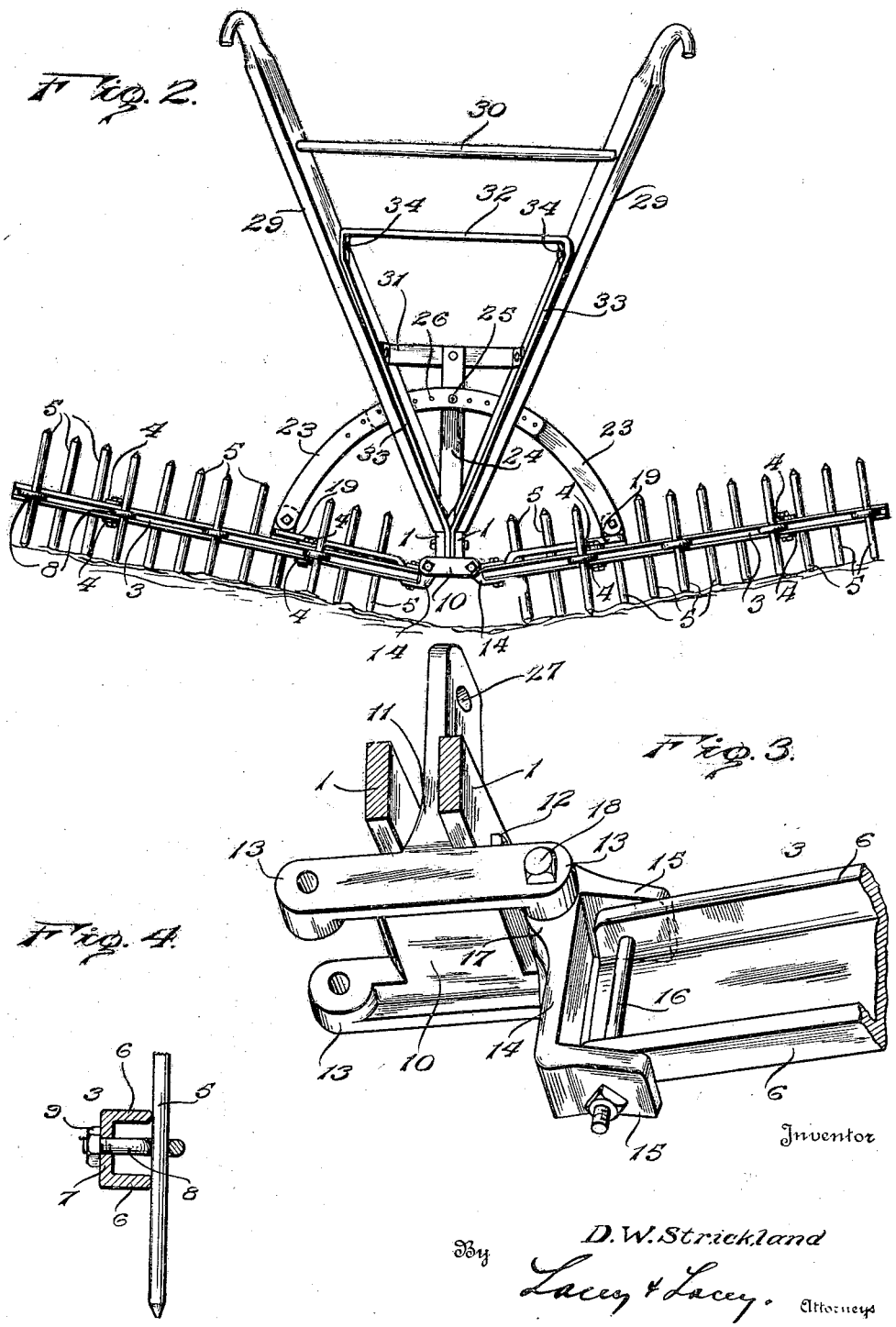

Patented Aug. 5, 1924.

1,503,722

UNITED STATES PATENT OFFICE.

DEWITT W. STRICKLAND, OF TYLERTOWN, MISSISSIPPI.

HARROW.

Application filed August 17, 1922. Serial No. 582,453.

*To all whom it may concern:*

Be it known that I, DEWITT W. STRICKLAND, a citizen of the United States, residing at Tylertown, in the county of Walthall and State of Mississippi, have invented certain new and useful Improvements in Harrows, of which the following is a specification.

This invention relates to harrows and has for its object the provision of an improved construction whereby the ground-engaging members of the implement may be adjusted to assume any desired angular relation to the beam in both horizontal and vertical planes. Another object of the invention is to provide an improved hinge connection between the harrow bars and the main beam, and a still further object of the invention is to provide means whereby the handles will be rigidly secured upon the beams, and also to provide a novel form of harrow bar.

In the accompanying drawings, which illustrate my present invention,

Figure 1 is a plan view of my improved harrow;

Fig. 2 is a rear end elevation of the same;

Fig. 3 is an enlarged detail perspective view of the hinge connection between the harrow bar and the main beam, and Fig. 4 is a detail cross section of the harrow bar.

The main beam of the implement in my present invention consists of two parallel bars 1 having a clevis 2 secured to and between their front ends. Arranged at the opposite sides of the main beam and hingedly connected thereto are harrow bars 3 which are preferably spaced equi-distantly and are disposed one at each end of the main beam and one at the center thereof, these harrow bars being maintained in their spaced parallel relation by connecting bars or beams 4 which are disposed parallel with the main beam and are pivotally attached to the several harrow bars, as clearly shown. As shown most clearly in Figs. 3 and 4, the harrow bars are channeled with their flanges disposed horizontally, the harrow teeth 5 being disposed against the rear edges of the horizontal flanges 6 and the vertical webs 7 of the harrow bars being provided with openings therethrough to receive the shanks of screw eyes 8, as shown in Fig. 4. The harrow teeth pass through the eyes of the screw eyes and nuts 9 are mounted upon the forward threaded extremities of the shanks of the screw eyes so that, when they are turned home against the web 7 of the harrow bars, the harrow teeth will be very firmly clamped between the rear wall of the eye and the rear edges of the flanges 6. The teeth are preferably rods of circular cross section having both ends pointed so that they may be disposed with either end uppermost and may be readily reversed when one end is worn so that the previously unused end may become active.

The hinge connections between the main beams 1 and the harrow bars consist of castings 10 having posts 11 rising from their upper sides to project between the bars 1 of the main beam and fit snugly between the same, a securing bolt 12 being inserted through the bars 1 and through the said posts to firmly secure the hinge member to the beam. The body of this hinge member is disposed below and against the lower edges of the bars 1 and is constructed at each side with laterally extending perforated lugs or ears 13 to receive a coupling by which the harrow bar is connected to the said casting or bracket. The said coupling member consists of a bracket having a central web 14 provided at its ends with laterally extending lugs or ears 15 which are adapted to fit above and below the flanges 6 of the adjacent harrow bar and a pivot bolt or pintle 16 is inserted through the said lugs 15 and the ends of the said flanges 6, as shown most clearly in Fig. 3, whereby the harrow bar will be pivotally attached to the coupling bracket. At its upper corner, the bracket is provided with a sleeve or hollow offset 17 which is adapted to fit between the adjacent lugs 13 and be pivotally connected to said lugs by a bolt or pintle 18 inserted through the lugs and the off-set sleeve, as will be readily understood. This arrangement provides a universal joint between the main beam and the harrow bar so that the bar may be swung in intersecting planes and thereby brought readily into any desired angular relation to the beam.

To maintain the harrow bars in a set position, I provide a holding and locking mechanism which consists of laterally extending bars 19 hingedly connected to the main beams at their ends and provided with series of openings 20, through any one of which and similar openings 21 in the innermost connecting bar 4, a locking pin 22 may be inserted so that the harrow bars may be readily secured to extend at a right angle from the main beam or to extend in an inclined position forwardly or rearwardly. The hinge connection between the locking bars 19 and the beam is identical with the hinge connection betwen the harrow bars and the beam and the pintle members of all the hinges are arranged in longitudinal alinement so that all the parts will have the same center of movement and will not bind when the harrow bars are being swung upwardly or downwardly. The holding and locking bars 19 may, if desired, be semi-circular in outline but such form is not necessary, and I have shown the forward halves of these bars as disposed along straight lines in the accompanying drawings. If the harrow bars be swung about their pivots 16, the outer ends thereof will be adjusted forwardly or rearwardly, as is obvious, and if the coupling members 14 be swung about their pivots 18, the harrows will be caused to assume inclined positions extending upwardly or downwardly from the main beam so that they may be set to conform to the hills or furrows in which they are to work, Fig. 2 of the present drawings showing the harrows inclining upwardly from the beam toward their outer ends. To maintain the beams in the position of vertical adjustment, I attach to the holding bars 19, at the centers thereof, the supporting arms 23 which extend inwardly from the bars 19 and have their inner free ends disposed to overlap each other and extend past a short standard 24 rising from the beam, the supporting arms 23 being arcuate in form and extending, respectively, in front and in rear of the said standard. A locking pin 25 is inserted through registering openings, indicated at 26, in the supporting arms and the standard whereby to hold the arms in a set position and maintain the vertical adjustment of the harrows.

The casting or hinge body 10 which is provided at the front end of the main beam has its post 11 extended above the bars 1 and provided with an opening 27 to receive a bolt 28 which is inserted through the front extremities of the handles 29. The handles 29, as clearly shown, are disposed at opposite sides of the post 11 and extend upwardly and rearwardly therefrom in diverging relation to a point beyond the rear end of the harrow so that the user may guide the harrow in a well-known manner. A round bar 30 is secured in and extends between the handle members near the rear ends thereof to impart rigidity to the structure and the handles are further supported by a cross bar 31 which is secured to the upper end of the standard 24 and has its ends rigidly secured to the handles. At the rear extremity of the main beam, I provide an additional reinforcement consisting of a flat bar bent into triangular form presenting a bridge member 32 extending between the handles and downwardly converging side members 33 which have their extremities disposed between and rigidly secured to the rear extremities of the bars 1. This triangular reinforcing frame is rigidly secured to the handles at the ends of the bridge member 32, as indicated at 34.

It will be readily noted that I have provided a structure whereby the handles will be very rigidly connected with the main beam of the harrow so that all strain imposed upon the handles in the use of the implement will be very effectually resisted. It will also be readily noted that I have provided a very simple and effective construction whereby the harrow bars will be connected to the beam so that they may be adjusted easily to assume any desired angular relation to the main beam and will be positively held in a set position by simple and inexpensive devices. The form of the coupling between the harow bars and the main beam of the implement is such that the harrow bars are suspended below the beam rather than supported above the beam and the weight of the harrows is thereby more effectually utilized in holding the harrows to the work. At the same time, the construction is such that any possible tendency of the harrows to twist laterally upon their hinge connections is effectually overcome and the said hinge connections maintained in proper relation to the main beam throughout the life of the harrow.

Having thus described the invention, what is claimed as new is:

1. In an agricultural implement, the combination of a main beam consisting of parallel bars, a hinge member disposed below said bars and having a post fitting between the same and rigidly secured thereto, a coupling member hinged to the outer end of said hinge member and depending therefrom to swing toward or from the beam, a harrow bar pivoted to said coupling member to swing across the plane of movement of the coupling member, and means for holding the harrow bar in a set position.

2. In an agricultural implement, the combination with a main beam consisting of a pair of parallel bars, of hinge members disposed below the said beam and having posts secured between the bars composing said beam, the said hinge members being provided with laterally extending lugs at the sides of the beam, coupling members pivoted at their upper corners between the said lugs, harrow bars pivotally mounted upon the outer sides of said coupling members, the pivotal connections between the harrow bars and the couplings being at right angles to the pivotal connections between the couplings and the hinge members, connections between the harrow bars whereby to maintain them in parallel relation, and means for holding the harrow bars in a set position.

3. In an agricultural implement, the combination of a main beam consisting of parallel bars, hinge members secured to said bars at the ends and at intermediate points of the same, said members being provided with posts fitting between the bars and rigidly secured thereto and the posts on the hinge member at the front end of the bars projecting above the same, harrow bars coupled to the said hinge member for universal movement, means for maintaining the harrow bars in parallel relation, means for securing the harrow bars in a set position, handle members secured at their front extremities to the upwardly projecting post of the foremost hinge member, and means in rear of said post for connecting the handles to the beam and reinforcing the handles.

In testimony whereof I affix my signature.

DEWITT W. STRICKLAND. [L. S.]